Nov. 27, 1962

J. R. BOYKIN 3,065,910

ANALOG COORDINATE CONVERTER

Filed March 19, 1957

WITNESSES

Leon J. Jaza

George C. Thompson Jr.

INVENTOR
John R. Boykin
BY
Paul E. Friedemann
ATTORNEY

United States Patent Office 3,065,910
Patented Nov. 27, 1962

3,065,910
ANALOG COORDINATE CONVERTER
John R. Boykin, Glen Burnie, Md., assignor to Westinghouse Electric Corporation, East Pittsburgh, Pa., a corporation of Pennsylvania
Filed Mar. 19, 1957, Ser. No. 647,001
5 Claims. (Cl. 235—189)

This invention relates to an analog coordinate converter, and more particularly, to a system of converting ground coordinates to slant coordinates and other desirable conversions.

In radar parlance, the slant range to a target is the range given in X and Y components along the plane from the radar set to the target. The ground range is that range given in X and Y components in a horizontal plane with the addition of the height to the target. However, the use of Cartesian coordinates to transmit information about a target is becoming the usual thing. In order to convert the Cartesian ground range coordinates to slant range coordinates, highly complex systems with many servo systems and operational amplifiers have heretofore been required.

It is, therefore, an object of this invention to present a system of converting from ground range coordinates to slant range coordinates that is relatively simple and composed of the least number of parts.

It is another object of this invention to provide a simple system of converting slant coordinates to ground coordinates when the height component is predetermined.

It is another object of this invention to provide an analog coordinate converter capable of high accuracy with the least number of component parts.

Other objects and purposes will become clear as the description of this invention progresses.

In practicing this invention there is provided amplifier means having input and output circuits. Each of the input and output circuits is provided with resistors each having in series therewith, a thermoelement capable of producing an output voltage in response to current flow through each of the aforementioned resistors. Associated with the amplifier means is a means for varying the amplifier output. This variable means is provided with a drive means controlled through a second amplifier means connected to each of the thermoelements in the input and output circuits. It can be seen that with this arrangement, the incoming and outgoing voltages are compared, amplified and used to drive the variable means in a direction to balance the input and output voltages in the proper ratio.

Figure 1:
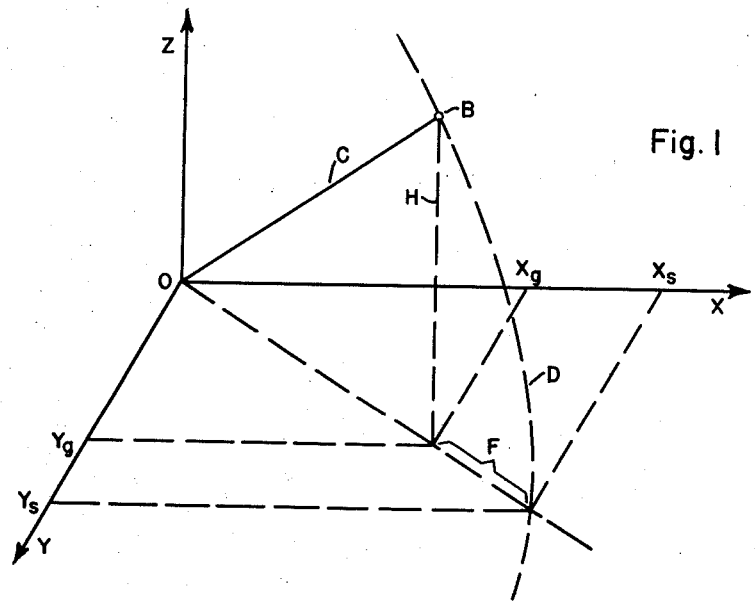
FIGURE 1 is a diagrammatic view of the relationship of a radar set to its target with the coordinates of the ground range and slant range shown.

The general relationship of the radar set O to the target B is set forth in FIG. 1. In this figure, the three coordinates necessary to give direction from the radar set O to the target B are shown by the axes X, Y and Z. As mentioned hereinbefore, a radar set placed at point O would read the slant range to the target B along the line C. The position of the target B, given in ground coordinates, can therefor be designated by $X_g$, $Y_g$ and the height H to the target B. It can be seen that if the slant range from the radar set O to the target B be rotated until it falls within the plane established by the X and Y axes, that this distance would scribe an arc, shown by the arc D of this figure. It can also be seen that the slant range coordinates, when placed in this plane would be of greater length than the ground range coordinates, less the height, and this a difference is designated as F. The slant range coordinates are now displayed as the coordinates $X_s$ and $Y_s$.

It should be clear that, if the slant range shown by the coordinates $X_s$ and $Y_s$ read by the radar set O in designating the target B was given in ground coordinates $X_g$ and $Y_g$ to the target B without considering the height H to the target B, that a substantial error would exist, this being shown by a difference in the coordinates of $X_g$ and $X_s$, $Y_g$ and $Y_s$.

Figure 2:
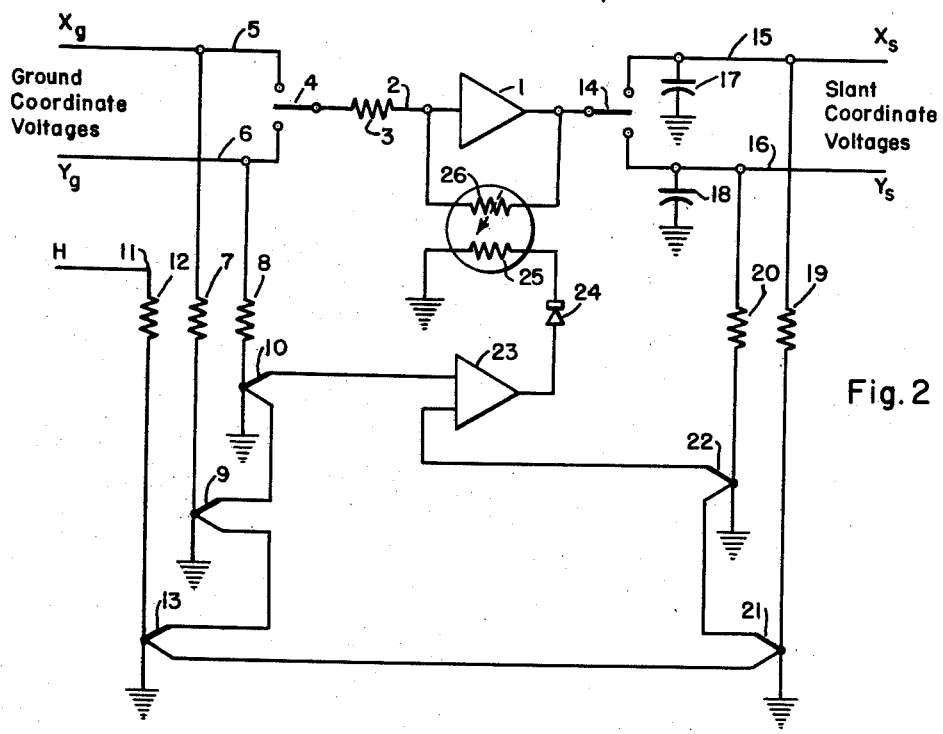
FIG. 2 is a schematic view of one form of this invention capable of converting ground range coordinates to slant range coordinates.

FIG. 2 discloses one schematic of this invention capable of converting from ground range coordinates and height to a target, to slant range coordinates while at the same time eliminating the error designated as F in FIG. 1. This embodiment discloses an amplifier 1, provided with an input circuit 2 having a current limiting resistor 3, and a synchronous chopper 4 capable of alternately applying voltages representing the ground X and Y coordinates $X_g$ and $Y_g$ to a target. The synchronous chopper 4 is shown in this view as a contact, movable between two positions for the sake of simplicity. This chopper can be of any well-known type and is not intended to be described in detail in this application.

The voltages representing the ground coordinates $X_g$ and $Y_g$ are applied to the conductors 5 and 6, respectively; each having current resistors 7 and 8, respectively; connected between the respective conductors and ground. Connected in series with the current resistors 7 and 8 are the respective thermoelements 9 and 10. The thermoelements 9 and 10 are of the instrument type of devices capable of responding to the current flow through the resistors 7 and 8 to ground, such that each thermoelement produces an output voltage which is proportional to the square of the current passed through resistors 7 and 8.

In order to prevent any error from existing in the conversion of ground coordinates to slant coordinates, it is necessary to utilize the voltage representing the height from the ground to the target B. The height voltage is then applied to a conductor 11, which is connected through the current resistor 12 and a thermoelement 13 to ground. Similar to the thermoelements 9 and 10, the thermoelement 13 develops a voltage proportional to the square of the current through the resistor 12, developed by the voltage applied to the conductor 11.

The amplifier 1 output is fed through a second synchronous chopper 14, capable of alternately applying the output voltage to the conductors 15 and 16 with the output voltage representing the slant range coordinates $X_s$ and $Y_s$. The conductor 15 is provided with an output smoothing capacitor 17 and the conductor 16 is provided with another output smoothing capacitor 18. The synchronous chopper 14 is identical with the synchronous chopper 4 and can be of any well-known type and which is not described in detail in this disclosure. It should be pointed out, however, that the choppers 4 and 14 operate in synchronism so that the coordinate voltage $X_g$ is applied to the input of amplifier 1 during the time that the conductor 15 is connected to the output of the amplifier 1 producing the slant coordinate voltage $V_s$. In a similar manner, the choppers 4 and 14 simultaneously connect the conductor 6 with ground coordinate $Y_g$ voltage applied thereto with the input of the amplifier 1 while the chopper 14 applies the conductor 16 to the output of amplifier 1 producing the coordinate $Y_s$.

In a manner similar to the input circuit, the output conductors 15 and 16 have connected thereto the respective current resistors 19 and 20. The current resistors 19 and 20 are then connected through the thermoelements 21 and 22 to ground. It can be seen, therefore, that the thermoelements 21 and 22 would also have output voltages proportional to the square of the current passed through the respective resistors 19 and 20.

The output voltages from the thermoelements 9, 10, 13, 21 and 22 are then connected into a series input circuit for an error amplifier 23. The output of the amplifier 23 is then fed through a rectifier 24 and heater element 25 to ground. Associated with the heater resistor 25 of the output circuit of the amplifier 23 is a thermistor 26. The thermistor 26 is then connected in parallel with the amplifier 1. It can be seen, therefore, that the output of the amplifier 23 will vary in response to each of the input voltages as compared to each of the output voltages. For this reason, the output voltage supplied by the amplifier 23 is considered an error voltage to be used to readjust the output of the amplifier 1 to the proper level, as described hereinafter.

Operation of the circuit described in FIG. 2 is as follows: In order to convert ground range coordinates' voltages $X_g$ and $Y_g$ and height H to the target from ground to slant range coordinates $X_s$ and $Y_s$, the ground range coordinates $X_g$ and $Y_g$ are applied through the conductors 5 and 6, synchronous chopper 4 and resistor 3 to the input of the amplifier 1. These voltages are then amplified in sequence and applied sequentially to the conductors 15 and 16 representing the slant range coordinate voltages $X_s$ and $Y_s$. Each of the voltages $X_g$ and $Y_g$ and $X_s$ and $Y_s$ and, in addition, the voltage represented by the height H to the target B are then fed through identical current resistors and thermoelements to ground. Each of the thermoelements 9, 10, 13, 21 and 22 then produces a voltage proportional to the square of the current in its respective associated current resistor. The thermoelement voltages are then combined and applied to the input of the error amplifier 23. Any difference in voltage remaining after the comparison of the input and output thermoelement voltages is then amplified by the amplifier 23 and used to heat the heater element 25 of the heater thermistor combination. The thermistor 26, being the type of device that is capable of changing its resistance upon a change in temperature and being in parallel with the amplifier 1, then varies the output of the amplifier 1 up or down in a direct response to the output of the amplifier 23.

Figure 3:
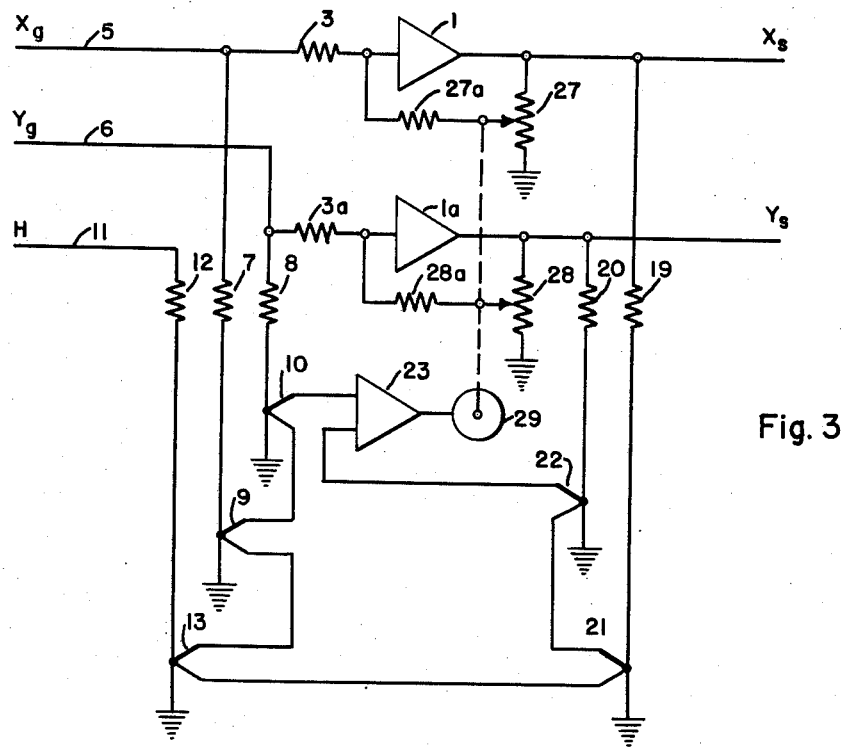
FIG. 3 is a schematic view of another form of this invention capable of converting ground range coordinates to slant range coordinates; and, FIG. 4 is a schematic view of still another embodiment of this invention capable of converting slant range coordinates to ground range coordinates when the height component is known.

The structure shown in FIG. 3 is similar to that shown in FIG. 2, and is provided for the purpose of converting ground range coordinates and height to slant range coordinates. This modification differs from the modification shown in FIG. 2 in the use of two amplifiers in place of the single amplifier 1 of FIG. 2. This structure also differs from the species of FIG. 2 in the use of a pair of potentiometers provided with a motor-drive means, controlled by the error amplifier 23 in place of the heater thermistor device of FIG. 2.

In this species, a ground range coordinate voltage $X_g$, applied to the input conductor 5, is fed through the limiting resistor 3 to the input of the amplifier 1, whose output is applied to the conductor 15 representing the slant range voltage $X_s$. Likewise, the ground range coordinate voltage $Y_g$ is applied to the conductor 6 through the limiting resistor 3a, to the amplifier 1a, whose output is applied to the conductor 16, and represents the slant range voltage $Y_s$. Since two amplifiers are use to separately amplify the voltages $X_g$ and $Y_g$, it is unnecessary to provide synchronous choppers, as is the case of FIG. 2.

The output voltages of the amplifiers 1 and 1a are varied through the use of parallel connected potentiometers 27 and 28, respectively. The variable tap of each of the potentiometers 27 and 28 is connected through a series resistance 27a and 28a, respectively, to the input circuit of the respective amplifiers 1 and 1a. The variable taps of the potentiometers 27 and 28 are then ganged and connected to drive-motor 29. Drive-motor 29 is controlled by an error amplifier 23 having a control circuit identical with that shown in FIG. 2. It should be clear, therefore, that any error existing among the input and output voltages detected by the error amplifier 23 is used to control the drive-motor 29 to reposition the potentiometer taps of the potentiometers 27 and 28 to change the output of the amplifiers 1 and 1a to return the system to a balance.

Figure 4:
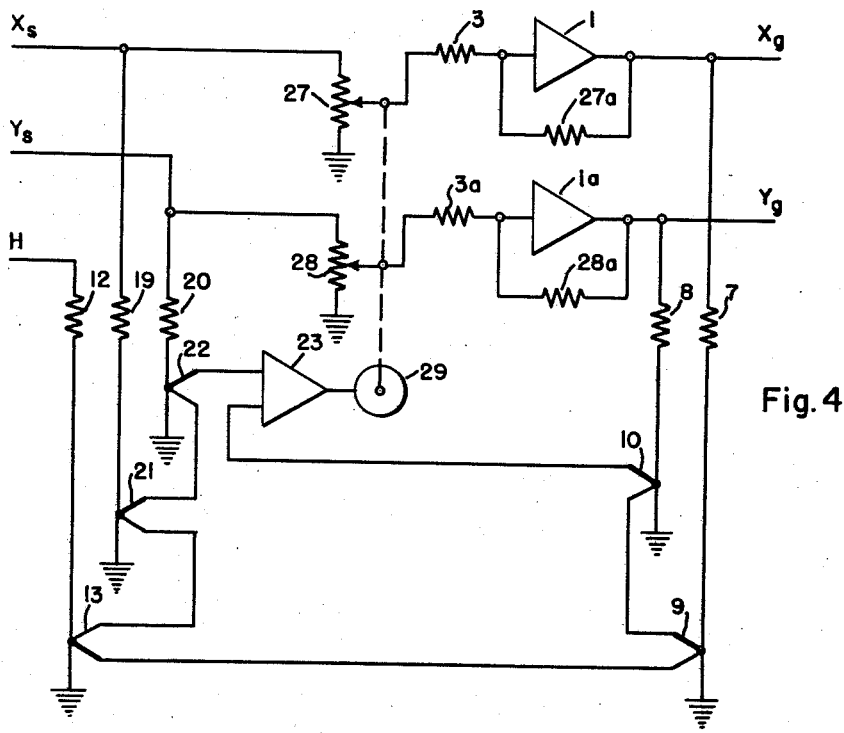

The species shown in FIG. 4 is identical with that of FIG. 3, with the exception that this circuit is used to convert slant range coordinate voltages $X_s$ and $Y_s$ to the target B to ground range coordinates when the height is predetermined. The modification differs structurally from FIG. 3, by placement of the potentiometers 27 and 28 in the input circuit to the amplifiers 1 and 1a, respectively, rather than having the potentiometers placed in parallel with the amplifiers 1 and 1a. The parallel limiting fixed resistors 27a and 28a are still connected in parallel with the amplifiers 1 and 1a, similar to that shown in FIG. 3.

Operation of this species is similar with that of FIG. 3. In this species, however, the height voltage is shown as an input voltage associated with the slant voltages $X_s$ and $Y_s$ and for this reason, the height thermoelement output voltage is of opposite polarity to the slant range voltages. The output voltage of the thermoelement 13, associated with the height voltage is in opposition to output voltages of the thermoelements 21 and 22. This thermoelement output voltage relationship is also true in FIG. 3, however the thermoelements 21 and 22 shown associated with the output circuit of FIG. 3, rather than the input as shown in FIG. 4. The output voltages of the thermoelements are added in a manner similar to that of FIG. 3.

The analog coordinate converters of this invention, in order to present true slant range to ground range conversion must solve the following two equations simultaneously.

(1) $$X_g^2 + Y_g^2 + H^2 = X_s^2 + Y_s^2$$

(2) $$\frac{X_g}{X_s} = \frac{Y_g}{Y_s}$$

The three disclosed systems are shown to solve the equations as indicated in the following paragraphs. In order to solve equation $$X_g^2 + Y_g^2 + H^2 + X_s^2 + Y_s^2$$

each of the five input and output voltages are fed through identical resistors 7, 8, 12, 19 and 20. These resistors then derive analog currents of the voltage quantities $X_g$, $Y_g$, $X_s$, $Y_s$ and H. These currents are then passed through instrument type thermoelements capable of an output voltage which is proportional to the square of the analog current passed through the thermoelements. The thermoelement output voltages can be represented by the symbols $KX_g^2$, $KY_g^2$, $KX_s^2$, $KY_s^2$ and $KH_s^2$, where K is a common constant. With the thermoelements connected, as shown in each of the figures, an output error voltage E will be developed equal to $$E = KX_g^2 + KY_g^2 + KH^2 - KH^2 - KX_s^2 - KY_s^2$$

The error voltage is then amplified by the amplifier 23 and used to vary the outputs of the amplifier 1 or each of the amplifiers 1 and 1a until the error voltage is zero. Thus, satisfying Equation 1.

In the species shown by FIGURES 3 and 4 with the sliders ganged, it can be seen that a fixed relationship between the ground and slant X and Y coordinate voltages will be maintained. For example $$\frac{X_g}{X_s} = \frac{Y_g}{Y_s}$$

In the case of FIG. 2, the relationship of equation $$\frac{X_g}{X_s} = \frac{Y_g}{Y_s}$$

is obviously maintained since the heater element 25 effect on the thermistor 26 is the same for both the X and Y voltage comparisons.

Since certain changes may be made in the above apparatus and different embodiments of the invention may be made without departing from the spirit and scope thereof, it is intended that all matter contained in the above-description or shown in the accompanying drawings shall be interpreted as illustrative and not in a limiting sense.

I claim as my invention:

1. An analog coordinate converter operative with a plurality of input signals and comprising first and second amplifier means each being provided with an output circuit and an input circuit operative with some of said input signals, signal control means for controlling the energy level of the output signal supplied by each of the amplifier means to their respective output circuits, first signal detector means operative with each of said input signals for determining the energy level of all said input signals, second signal detector means operative with the output signal of said first amplifier means for determining the energy level thereof, with said signal control means being operative with each of said first and second signal detector means for controlling the energy level of the respective output signals of said first and second amplifier means in accordance with the energy level of at least another one of said input signals.

2. An analog coordinate converter operative with a plurality of input signals and comprising first amplifier means provided with an output circuit and an input circuit operative with some of said input signals, signal control means for controlling the energy level of the output signal supplied by said first amplifier means to said output circuit, first signal detector means operative with each of said input signals for determining the energy level of all said input signals, second signal detector means operative with said output signal for determining the energy level of said output signal, and second amplifier means operative with said signal control means and connected to each of said first and second signal detector means for controlling the energy level of said output signal in accordance with the energy level of at least another one of said input signals.

3. An analog coordinate converter operative with a plurality of input signals and comprising first and second amplifier means each provided with an output circuit and an input circuit operative with some of said input signals, signal control means including at least respective adjustable potentiometers for controlling the energy level of the output signal supplied by each of said first and second amplifier means to the respective output circuits, first signal detector means operative with each of said input signals for determining the energy level of all said input signals, second signal detector means operative with said output signals for determining the energy level of said output signals, with said signal control means including drive means being operative with each of said first and second signal detector means for controlling the adjustment of said respective potentiometers and thereby the energy level of the respective output signals in accordance with the energy level of at least a different one of said input signals.

4. An analog coordinate converter having a plurality of input means comprising, in combination: amplifier means; some of said plurality of input means operably connected to said amplifier means; output means responsive to the output of said amplifier means; means for varying the gain of said amplifier means; and means for comparing a preselected mathematical summation of the input signal present at each of said plurality of input means to the output means for varying said amplifier means in accordance with the difference.

5. An analog coordinate converter having a plurality of input means, comprising, in combination: amplifier means; some of said plurality of input means operably connected to said amplifier means; an output means operative with said amplifier means for each input means that is operably connected to said amplifier means; and means responsive to a comparison of the sum of the mathematical square of each input signal at all of said plurality of input means to the sum of the squares of the mathematical sum of the output of each output means for varying the gain of said amplifier means.

References Cited in the file of this patent

UNITED STATES PATENTS

| | | |
|---|---|---|
| 2,471,262 | Cousins | May 24, 1949 |
| 2,496,674 | Omberg | Feb. 7, 1950 |
| 2,812,132 | Hauser | Nov. 5, 1957 |
| 2,857,569 | Gilbert | Oct. 21, 1958 |
| 2,917,237 | Davidson | Dec. 15, 1959 |

OTHER REFERENCES

Korn and Korn; Electronic Analog Computers, McGraw-Hill, 1956, page 93.